(12) United States Patent
Nakayama et al.

(10) Patent No.: US 7,788,379 B2
(45) Date of Patent: Aug. 31, 2010

(54) NETWORK SYSTEM AND INFORMATION PROCESSING METHOD

(75) Inventors: Koichiro Nakayama, Fukuoka (JP); Kanna Okamura, Fukuoka (JP); Hiroki Tamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 11/835,135

(22) Filed: Aug. 7, 2007

(65) Prior Publication Data

US 2008/0040512 A1   Feb. 14, 2008

(30) Foreign Application Priority Data

Aug. 10, 2006   (JP)   ............... 2006-218897

(51) Int. Cl.
*G06F 13/00*   (2006.01)
(52) U.S. Cl. .................... 709/226; 709/214; 709/215
(58) Field of Classification Search ......... 709/201–203, 709/219–227, 231, 235, 212, 213, 214, 215, 709/216
See application file for complete search history.

(56) References Cited

U.S. PATENT DOCUMENTS

| | | | | |
|---|---|---|---|---|
| 5,586,331 | A * | 12/1996 | Levenstein | 710/200 |
| 6,523,065 | B1 * | 2/2003 | Combs et al. | 709/226 |
| 6,944,861 | B2 * | 9/2005 | Inoue et al. | 718/101 |
| 7,035,858 | B2 * | 4/2006 | Dinker et al. | 707/10 |
| 7,051,098 | B2 * | 5/2006 | Masters et al. | 709/224 |
| 7,069,293 | B2 * | 6/2006 | Cox et al. | 709/203 |
| 7,080,400 | B1 * | 7/2006 | Navar | 725/139 |
| 7,181,743 | B2 * | 2/2007 | Werme et al. | 718/104 |
| 7,216,142 | B2 * | 5/2007 | Whipple et al. | 709/203 |
| 7,257,638 | B2 * | 8/2007 | Celik et al. | 709/231 |
| 7,426,570 | B2 * | 9/2008 | Andrzejak et al. | 709/235 |
| 7,546,375 | B2 * | 6/2009 | Tantek et al. | 709/231 |
| 2005/0188223 | A1 * | 8/2005 | Hasegawa et al. | 713/201 |
| 2006/0224706 | A1 * | 10/2006 | Kudo et al. | 709/220 |

FOREIGN PATENT DOCUMENTS

| | | |
|---|---|---|
| JP | 03-098153 | 4/1991 |
| JP | 2003-162514 | 6/2003 |
| WO | 2006/072987 | 7/2006 |

\* cited by examiner

*Primary Examiner*—Viet Vu
(74) *Attorney, Agent, or Firm*—Katten Muchin Rosenman LLP

(57) ABSTRACT

A network system is composed of a plurality of information processing apparatuses connected to a ring network, and a program, which is to be executed by sharing the resources of the information processing apparatuses, is divided into predetermined units and stored in a plurality of information processing apparatuses, where an information processing apparatus determines whether all pieces of the divided program have been stored in the memory; when there is a program which has not been stored, transmits to another information processing apparatus a transmission request for the program; determines whether a program received by a communication section is the program transmitted from another information processing apparatus in response to the transmission request; stores the received program in the memory when it is transmitted in response to the transmission request; and executes the program stored in the memory when all pieces of the divided program have been stored.

6 Claims, 6 Drawing Sheets

NETWORK SYSTEM AND INFORMATION PROCESSING METHOD

CROSS-REFERENCE TO RELATED APPLICATION

This non-provisional application claims priority under 35 U.S.C. §119(a) on Patent Application No. 2006-218897 filed in Japan on Aug. 10, 2006, the entire contents of which are hereby incorporated by reference.

BACKGROUND

1. Technical Field

The present application relates to a network system and an information processing method, capable of storing programs dividedly on a plurality of information processing apparatuses connected in a ring form, collecting necessary programs for execution, and executing the programs.

2. Description of the Related Art

With the recent advancement of communication techniques, an expanding range of services including IP telephony service is offered as services provided through general networks. Programs installed in IP communication apparatuses for use in such services are downloaded via a network, for example, the Internet.

FIG. 1 is a block diagram showing the structure of a conventional IP communication system. In the conventional IP communication system, for example, a plurality of IP communication apparatuses 1, 1, . . . are connected to a ring network 2, and an external storage apparatus 3 which is shared by all the IP communication apparatuses 1, 1, . . . is connected within the network 2. Programs to be executed by the respective IP communication apparatuses 1 are stored in the external storage apparatus 3.

Each IP communication apparatus 1 stores a minimum number of programs necessary for activation, and programs necessary for processing are downloaded from the external storage apparatus 3. Each IP communication apparatus 1 extracts a downloaded program into the own memory and executes the program (see, for example, Japanese Patent Application Laid-Open No. 3-98153(1991)).

In the case where the IP communication apparatuses 1, 1, are connected in a ring form, if an error occurs in one IP communication apparatus 1, it causes an error in downloading programs to other IP communication apparatuses 1, 1, . . . . Therefore, for example, by using a fault-tolerant circuit as disclosed in Japanese Patent Application Laid-Open No. 2003-162514, redundancy is provided for errors.

However, in the IP communication system with the structure shown in FIG. 1, since the external storage apparatus 3 for downloading programs is required, it is difficult to simplify the system structure. Moreover, when errors occur on a line connecting the external storage apparatus 3 and the ring network 2, there arises a problem that programs necessary for the IP communication apparatuses 1, 1, . . . can not be downloaded.

Further, even when programs are downloaded into the IP communication apparatuses 1, 1, . . . , if a program to be executed is a large program and there is not a sufficient available memory capacity, it is impossible to extract the downloaded program into the memory. Thus, there are also problems that the downloaded program can not be executed or may cause erroneous operations.

SUMMARY

The present application has been made with the aim of solving the above problems, and it is an object of the present application to provide a network system and an information processing method which enable sharing of programs, which are to be executed, within the same network without separately providing an external storage apparatus.

It is another object of the application to provide a network system and an information processing method capable of certainly executing a program to be downloaded even when that program is a large program, by sharing memories of other information processing apparatuses within the same network.

In order to achieve the above objects, a network system according to the present application is characterized by comprising: a plurality of information processing apparatuses, each having a memory and communication means and being connected to a ring network through the communication means, wherein a program, which is to be executed by sharing a resource of each of the information processing apparatuses, is divided into predetermined units and stored in a plurality of information processing apparatuses, one information processing apparatus comprises: means for determining whether or not all pieces of the divided program have been stored in the memory; means for, when a determination is made that there is a program which has not been stored in the memory, transmitting through the communication means to other information processing apparatus a transmission request for the program which has not been stored; means for determining whether or not a program received by the communication means is a program transmitted from the other information processing apparatus in response to the transmission request; means for, when a determination is made that the received program is the program transmitted in response to the transmission request, storing the program received by the communication means on the memory; and means for, when a determination is made that all pieces of the divided program have been stored in the memory, executing the program stored in the memory.

The network system according to the present application is also characterized in that the divided program is stored redundantly in a plurality of information processing apparatuses.

The network system according to the present application is also characterized in that a priority level for responding to the transmission request is assigned to each program stored redundantly in a plurality of information processing apparatuses, and the other information processing apparatus transmits the program according to the priority level.

The network system according to the present application is also characterized in that the memory of each information processing apparatus is sharable by a plurality of information processing apparatuses, information about available memory capacity which is required when executing the program is stored in the plurality of information processing apparatuses, the one information processing apparatus further comprises: means for determining whether or not an available memory capacity of the one information processing apparatus is smaller than the stored available memory capacity; means for, when a determination is made that the available memory capacity of the one apparatus is smaller than the stored available memory capacity, transmitting a memory use request to another information processing apparatuses through the communication means; and means for receiving information about available memory capacity transmitted from said another information processing apparatuses, and the memories of said another information processing apparatuses are used as a shared memory in order from the largest available memory capacity, based on the received information about available memory capacity.

An information processing method according to the present application is an information processing method which uses a network including a plurality of information processing apparatuses connected in a ring form and shares a resource of each of the information processing apparatuses, and characterized by storing a program to be executed, which is divided into predetermined units, in a plurality of information processing apparatuses, and one information processing apparatus determining whether or not all pieces of the divided program have been stored, transmitting a transmission request for a program which has not been stored to another information processing apparatus when a determination is made that all pieces of the divided program have not been stored, determining whether or not a program received from another information processing apparatus is a program corresponding to the transmission request, storing the received program when a determination is made that the received program is the program corresponding to the transmission request, and executing the program, which is to be executed, when a determination is made that all pieces of the divided program have been stored.

An information processing method according to the present application is characterized in that a memory of each information processing apparatus is sharable by a plurality of information processing apparatuses, information about available memory capacity which is required when executing the program is stored in the plurality of information processing apparatuses, and the one information processing apparatuses determines whether or not an available memory capacity of the one information processing apparatus is smaller than the stored available memory capacity; transmits a memory use request to another information processing apparatus when a determination is made that the available memory capacity of the one information processing apparatus is smaller than the stored available memory capacity; receives information about available memory capacity transmitted from another information processing apparatuses; and uses the memories of another information processing apparatuses as a shared memory in order from the largest available memory capacity, based on the received information about available memory capacity.

In the present application, a program to be executed, which is divided into predetermined units, is stored in a plurality of information processing apparatuses. When executing a desired program by one information processing apparatus, the one information processing apparatus determines whether or not all pieces of the divided program have been stored in its own memory means. The one information processing apparatus transmits to another information processing apparatus a transmission request for a program which has not been stored, and determines whether or not a program received from another information processing apparatus is a program corresponding to the transmission request. When the one information processing apparatus determines that the received program is the program corresponding to the transmission request, it loads the program into the memory and executes the program. Hence, since a program to be executed is divided and stored in the information processing apparatuses within the network, there is no need to provide a large-capacity external storage apparatus within the network, and thus it is possible to build the network system at low cost. Moreover, by duplicating the ring network, or mirroring the divided program and storing them, it is possible to certainly obtain the divided program even when a line error occurs in a part of the network.

In the present application, the memory of each information processing apparatus is sharable by a plurality of information processing apparatuses, and information about available memory capacity which is required when executing the program is stored in one information processing apparatus. When executing a desired program by one information processing apparatus, if a determination is made that the available memory capacity of the one information processing apparatus is smaller than the stored available memory capacity, the one information processing apparatus transmits a memory use request to another information processing apparatuses, and receives the information about available memory capacity from another information processing apparatuses. The one information processing apparatus uses the memories of another information processing apparatuses as a shared memory in order from the largest available memory capacity, based on the received information about available memory capacity. Hence, even when the memory capacity to be used by the received program is extremely large, it is possible to certainly execute the program by sharing the available memories of another information processing apparatuses.

According to the present application, since a program to be executed is divided and stored in the information processing apparatuses within the network, there is no need to provide a large-capacity external storage apparatus within the network, and it is possible to build the network system at low cost. Moreover, by duplicating the ring network, or mirroring the divided program and storing them, it is possible to certainly obtain the divided program even when a line error occurs in a part of the network.

According to the present application, even when the memory capacity to be used by the received program is extremely large, it is possible to certainly execute the program by sharing the available memories of another information processing apparatuses.

The above and further objects and features of the invention will more fully be apparent from the following detailed description with accompanying drawings.

DETAILED DESCRIPTION

The following description will explain some embodiments in detail based on the drawings.

Embodiment 1

Figure 1:
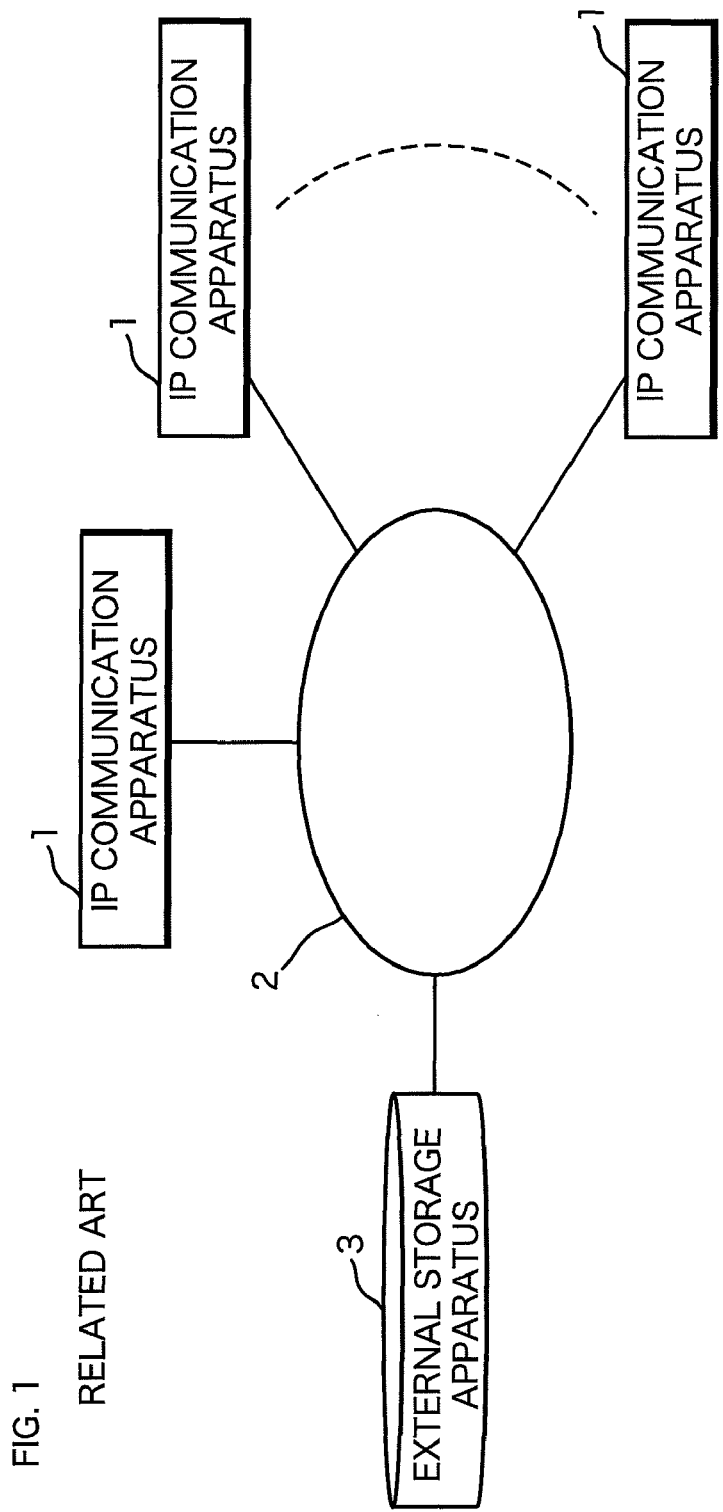
FIG. 1 is a block diagram showing the structure of a conventional IP communication system.
Figure 2:
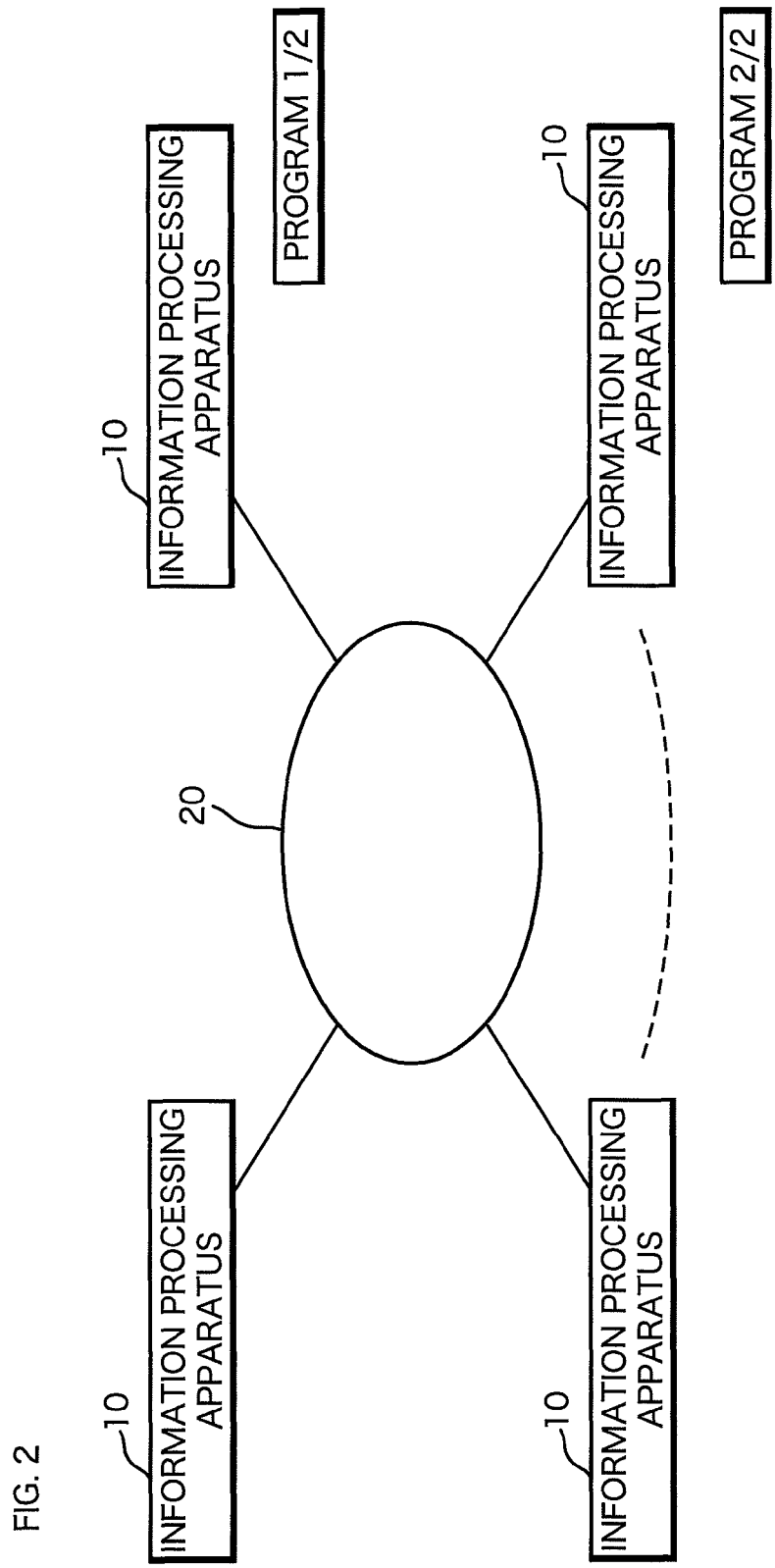
FIG. 2 is a block diagram showing the structure of a network system according to Embodiment 1.

FIG. 2 is a block diagram showing the structure of a network system according to Embodiment 1. As shown in FIG. 2, in the network system of Embodiment 1, a plurality of information processing apparatuses 10, 10, . . . are connected through a ring network 20. A program to be executed by the information processing apparatus 10 is divided into load module units, and distributed and stored in a plurality of information processing apparatuses 10, 10, . . . . In FIG. 2, for example, the program is divided into two pieces, and a program 1/2 and a program 2/2 are distributed and stored separately in the information processing apparatuses 10 and 10.

Figure 3:
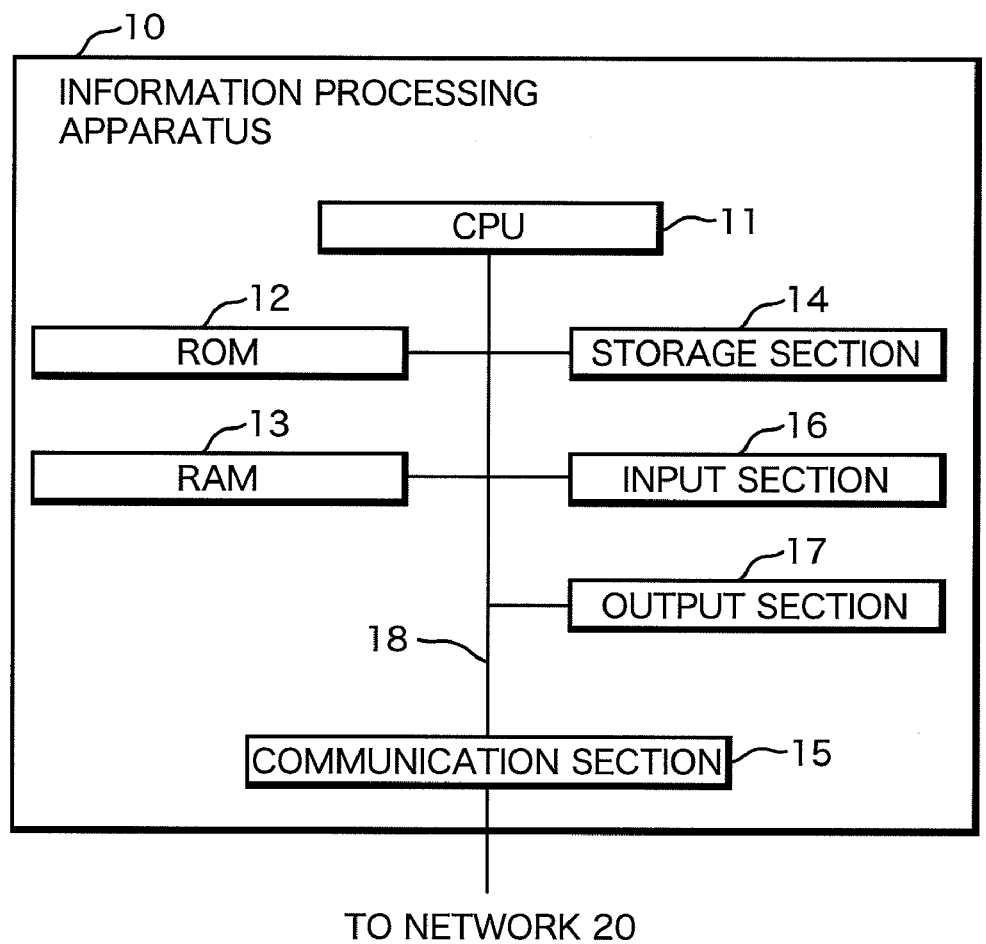
FIG. 3 is a block diagram showing the structure of an information processing apparatus in the network system according to Embodiment 1.

FIG. 3 is a block diagram showing the structure of the information processing apparatus 10 in the network system according to Embodiment 1. The information processing apparatus 10 in the network system of Embodiment 1 comprises at least a CPU 11, a ROM 12, a RAM 12, a storage section 14, a communication section 15, an input section 16, and an output section 17.

The CPU 11 starts an operation according to an activation program stored in the ROM 12. In the ROM 12, only the activation program is stored, and, for example, communication programs for causing the information processing apparatus 10 to function as an IP communication apparatus have not been stored.

The RAM 13 is composed of an SRAM or the like, and stores temporary data created during the execution of software. Moreover, the RAM 13 loads a program, which is to be executed by the information processing apparatus 10, at the time of execution. The storage section 14 is a fixed type storage device such as a hard disk, and stores divided programs which are divided into load module units. The storage section 14 is not limited to a fixed type storage device, and may be an auxiliary storage device using a portable storage medium, such as, for example, CD and DVD, or may be a storage device on an external computer which is connectable through the communication section 15.

The communication section 15 receives a divided program from outside, or sends a divided program. Moreover, the communication section 15 sends and receives a transmission request signal for a divided program, or a transmission request signal for information about available memory.

The input section 16 is an information input device such as a keyboard and a mouse. The output section 17 is a voice output device such as a speaker; a printing device such as a printer; and a display output device such as a display.

A program to be executed by one information processing apparatus 10 is divided into a plurality of load module units, and stored in the storage section 14 of the one information processing apparatus 10 and the storage sections 14, 14, . . . of another information processing apparatuses 10, 10, . . . . Note that the divided program is not necessarily stored in only one information processing apparatus 10 within the network 20, and it may be possible to store the same divided program in a plurality of information processing apparatuses 10 for backup in case of occurrence of errors in the information processing apparatus 10. In this case, in the header information of each stored divided program, a priority level representing the order of priorities about transmission is added to identify whether the program is the main program or the backup program.

When executing the program by one information processing apparatus 10, the one information processing apparatus 10 transmits a transmission request signal for a necessary divided program to another information processing apparatuses 10, 10, . . . . The transmission request signal is transferred successively to adjacent information processing apparatuses 10, 10, . . . within the network 20 connected in a ring form, and the one information processing apparatus 10 determines, for each of the information processing apparatuses 10 to which the signal was transferred, whether or not the information processing apparatus 10 stores a divided program corresponding to the received transmission request signal. If a determination is made that the corresponding divided program is stored, this another information processing apparatus 10 transmits the corresponding divided program to the information processing apparatus 10 which is the source of the transmission request signal.

The information processing apparatus 10 as the source of the transmission request signal reads the header information of the received divided program. Only when the information processing apparatus 10 confirms that the received program is the corresponding divided program, it extracts the program into the RAM 13, and executes the program when all necessary program pieces are extracted into the RAM 13.

Figure 4:
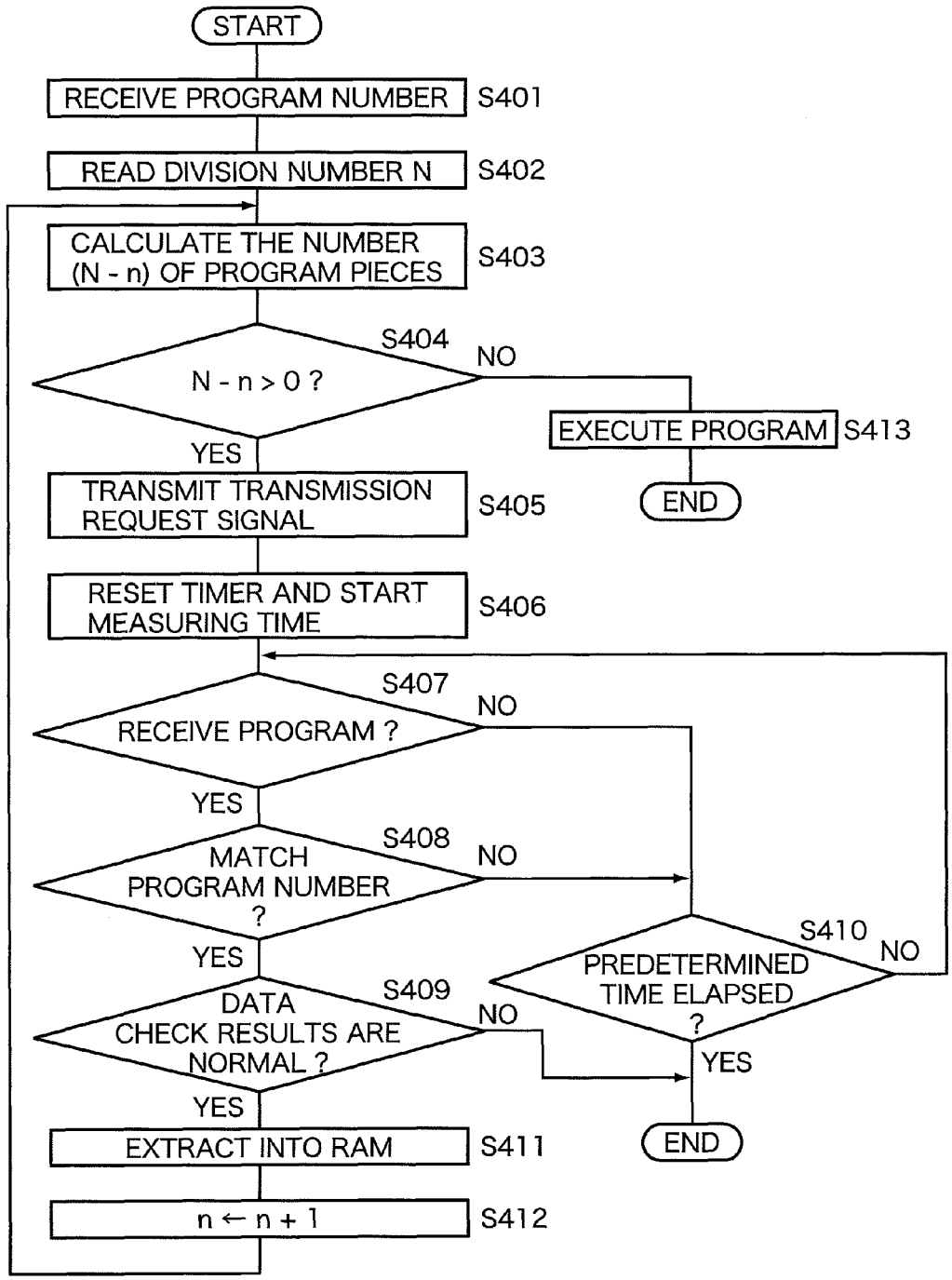
FIG. 4 is a flowchart showing the processing steps to be performed by the CPU of an information processing apparatus for executing a program in the network system of Embodiment 1.

FIG. 4 is a flowchart showing the processing steps to be performed by the CPU 11 of the information processing apparatus 10 for executing a program in the network system of Embodiment 1. When the CPU 11 of the information processing apparatus 10 for executing a program receives a program execute command through the input section 16, etc., it receives the program number identifying the received program (step S401), and reads from the storage section 14 a division number N into which the program was divided (step S402). In short, in the storage sections 14, 14, . . . of the information processing apparatuses 10, 10, . . . within the ring network 20 store the program number and the division number N of the program stored in a divided manner.

The CPU 11 counts the number n (n is a natural number) of pieces of the divided program stored in its own storage section 14, and calculates the number (N-n) of program pieces which need to be received (step S403). The CPU 11 determines whether the number (N-n) of program pieces which need to be received is positive or not (step S404).

When the CPU 11 determines that the number (N-n) of program pieces which need to be received is positive (step S404: YES), it determines that there are not sufficient pieces of the divided program (load modules) for executing the program, and transmits a transmission request signal to another information processing apparatuses 10, 10, . . . (step S405). The transmission request signal includes at least the program number of the requested program. The CPU 11 resets a timer and newly starts measuring time (step S406).

The CPU 11 determines whether or not it has received programs transmitted by another information processing apparatuses 10, 10, . . . in response to the transmission request signal (step S407). When the CPU 11 determines that it has received a program (step S407: YES), then the CPU 11 determines whether or not the program number of the received program matches the program number corresponding to the transmission request signal (step S408). When the CPU 11 determines that the program number of the received program matches the program number corresponding to the transmission request signal (step S408: YES), then the CPU 11 determines that the correct program was received, and determines whether or not the program was correctly received, based on whether or not the data check results are normal (step S409).

When the CPU 11 determines that it has not received a program (step S407: NO), and determines that the program number of the received program does not match the program number corresponding to the transmission request signal (step S408: NO), then the CPU 11 determines whether or not a predetermined time has elapsed (step S410). When the CPU 11 determines that the predetermined time has not elapsed (step S410: NO), the CPU 11 returns the processing to step S407, and repeats the above-described process.

When the CPU 11 determines that the predetermined time has elapsed (step S410: YES), and determines that the data check results are not normal (step S409: NO), then the CPU 11 determines that it failed to receive the divided program correctly, and finishes the processing. When the CPU 11 determines that the data check results are normal (step S409: YES), the CPU 11 determines that the divided program was received correctly, and extracts the received divided program into the RAM 13 (step S411).

The CPU 11 increments the number n of the acquired pieces of the divided program by "1" (step S412), returns the processing to step S403, and repeats the above-mentioned process. When the CPU 11 determines that the number (N-n) of program pieces which needs to be received is 0 (zero) or less (step S404: NO), then the CPU 11 determines that it has acquired all pieces of the divided program (load modules) required for executing the program, and executes the program (step S413).

Note that when errors occur in the information processing apparatuses 10, 10, . . . storing therein the divided program, or when errors occur in the ring network 20, there is a possibility that the divided program may not be obtained. Therefore, by taking redundancy measures such as duplicating the ring network 20, or mirroring the divided program by the main program and backup program and storing them in different information processing apparatuses 10 and 10, respectively, it is possible to certainly acquire the divided program.

When mirroring the divided program by the main program and backup program and storing them in different information processing apparatuses 10 and 10, respectively, a priority level for responding to the transmission request signal is given to each piece of the divided program at the time of storing. For example, a priority level "1" is given to the main program, and a priority level "0" is given to the backup program.

The information processing apparatus 10 for executing a program specifies the program number and the priority level of the requested program in the transmission request signal. The initial value of priority level is "1", and the information processing apparatus 10 acquires the divided program according to the same process as in FIG. 4. When the CPU 11 determines that the predetermined time has elapsed (step S410: YES), and determines that the data check results are not normal (step S409: NO), then the CPU 11 determines that the divided program was not received correctly, updates the initial value of priority level to "0", returns the processing to step S405, and transmits the transmission request signal again. Accordingly, in the processing performed for the second time, it is possible to receive the backup program whose priority level is "0", and it is possible to certainly receive the divided program even when errors occur in the information processing apparatuses 10, 10, . . . , or when errors occur in the ring network 20.

Figure 5:
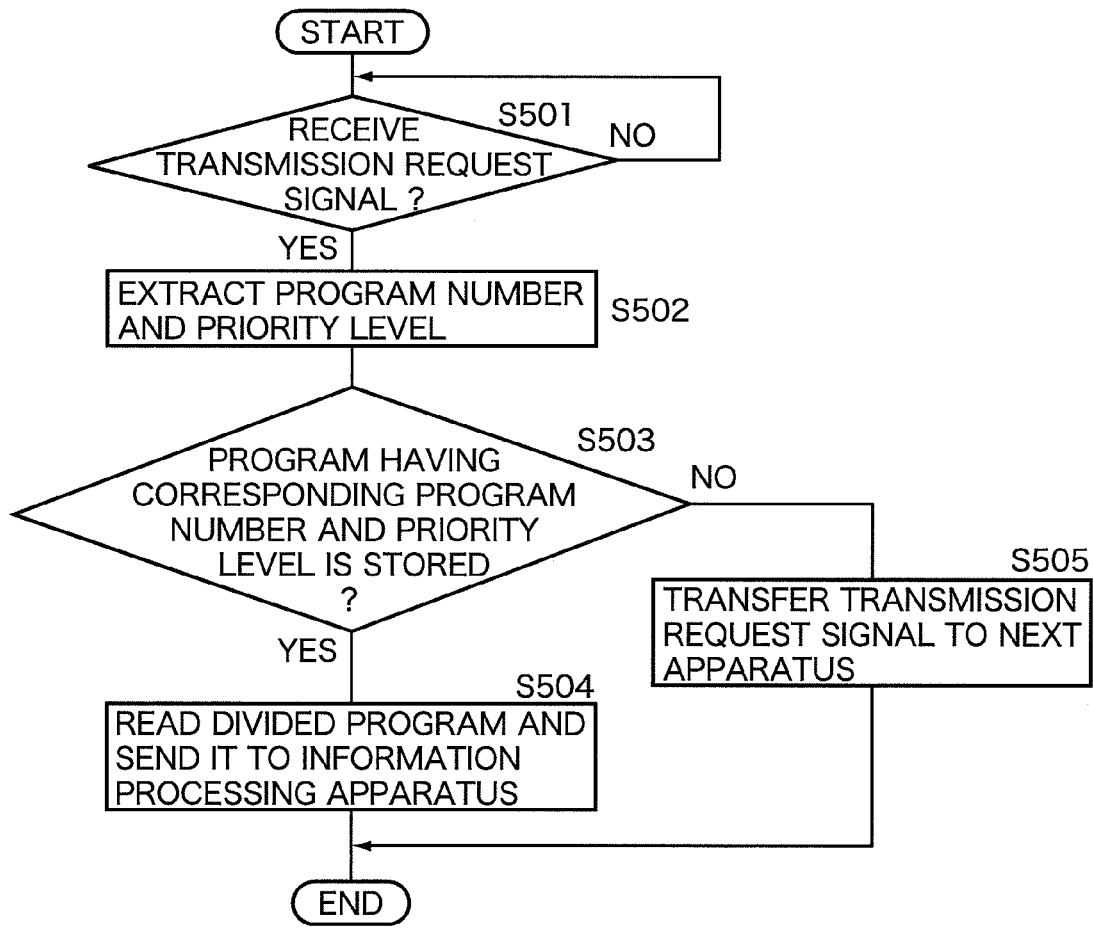
FIG. 5 is a flowchart showing the processing steps to be performed by the CPU of the information processing apparatus for returning the divided program in the network system of Embodiment 1.

FIG. 5 is a flowchart showing the processing steps to be performed by the CPU 11 of an information processing apparatus 10 which returns the divided program in the network system of Embodiment 1. The CPU 11 of the information processing apparatus 10 determines whether or not the transmission request signal was received from the information processing apparatus 10 which executes the program (step S501). The CPU 11 is in a standby state until receiving the transmission request signal (step S501: NO). When the CPU 11 determines that the transmission request signal was received (step S501: YES), then the CPU 11 extracts the program number and the priority level from the received transmission request signal (step S502).

The CPU 11 determines whether or not the divided program having the corresponding program number and priority level is stored in the storage section 14 (step S503). When the CPU 11 determines that the corresponding divided program is stored (step S503: YES), then the CPU 11 reads the divided program from the storage section 14 and sends it to the information processing apparatus 10 which is the source of the transmission request signal (step S504).

When the CPU 11 determines that the corresponding program is not stored (step S503: NO), then the CPU 11 transfers the transmission request signal to the next information processing apparatus 10 connected to the ring network 20 (step S505).

According to Embodiment 1 as described above, since a program to be executed is divided and stored in the information processing apparatuses 10, 10, . . . within the network 20, there is no need to provide a large-capacity external storage apparatus within the network, and thus it is possible to build the network system at low cost. Moreover, by duplicating the ring network 20, or mirroring the divided program and storing them, it is possible to certainly obtain the divided program even when a line error occurs in a part of the network 20.

Embodiment 2

Since the structure of a network system according to Embodiment 2 is the same as in Embodiment 1, the detailed explanation thereof is omitted by assigning the same reference codes. Embodiment 2 differs from Embodiment 1 in the point that available memories can be shared among a plurality of information processing apparatuses 10, 10, . . . so as to prevent insufficient available memory capacity even when a program to be executed is a large program.

In the storage section 14 of each information processing apparatus 10, the program number identifying a program to be executed and the memory capacity required for executing the program are stored. It is thus possible to confirm whether or not a necessary memory capacity is secured.

A program to be executed by one information processing apparatus 10 is divided into a plurality of load module units, and stored in the storage section 14 of the one information processing apparatus 10 and the storage sections 14, 14, . . . of another information processing apparatuses 10, 10, . . . . It is also possible to share the RAMs 13, 13, . . . of the respective information processing apparatuses 10, 10 . . . . By transferring a memory use request signal successively within the ring network 20, it is possible to acquire available memory capacity of each information processing apparatus 10, and it is possible to use the available memory capacities of the information processing apparatuses 10 as the shared memory in order from the largest available memory capacity.

Figure 6:
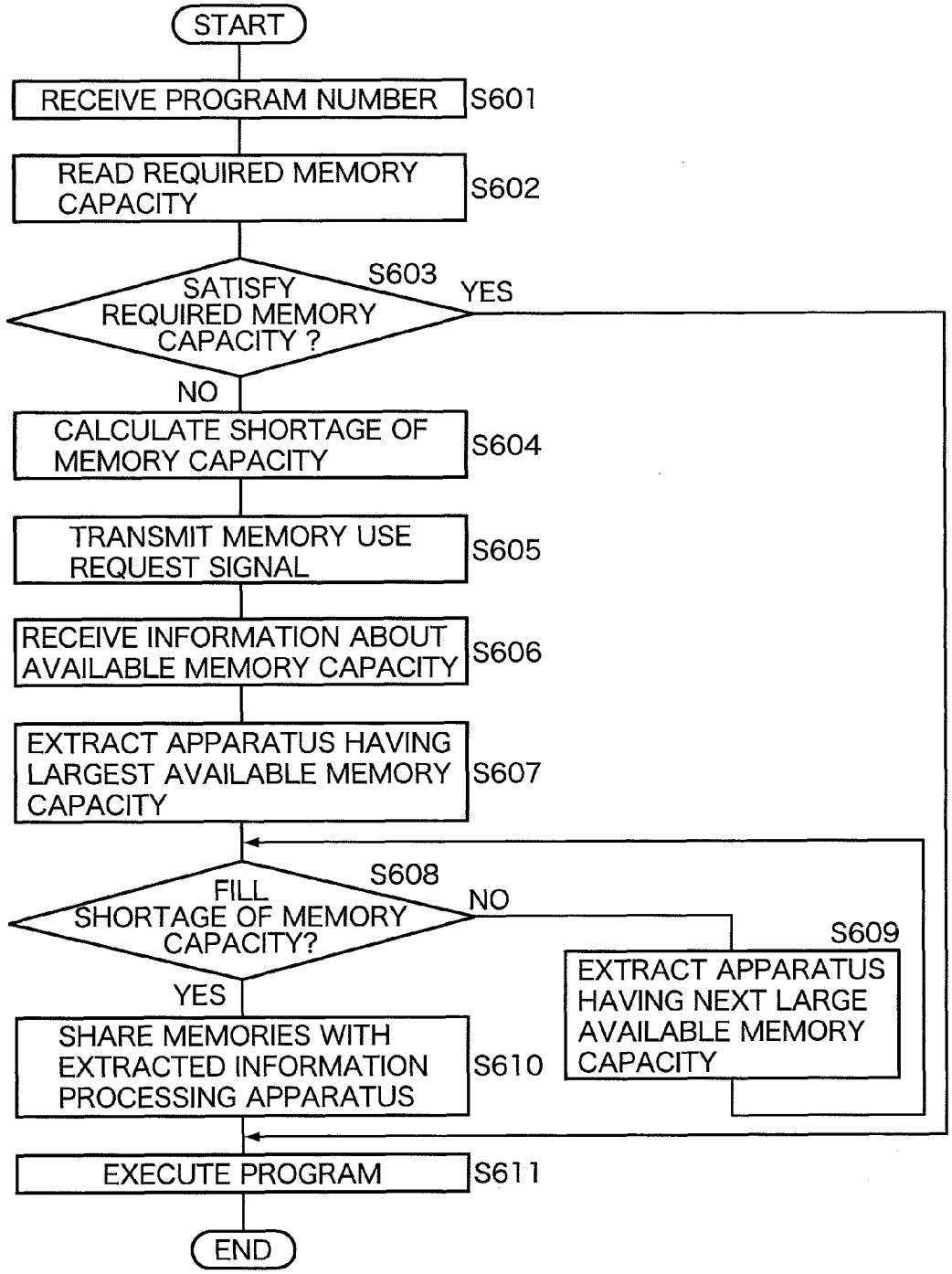
FIG. 6 is a flowchart showing the processing steps to be performed by the CPU of an information processing apparatus for executing a program in a network system of Embodiment 2.

FIG. 6 is a flowchart showing the processing steps to be performed by the CPU 11 of the information processing apparatus 10 for executing a program in the network system of Embodiment 2. When the CPU 11 of the information processing apparatus 10 for executing a program receives a program execute command through the input section 16, etc., it receives the program number identifying the received program (step S601), and reads a memory capacity required for executing the program from the storage section 14 (step S602).

The CPU 11 determines whether or not the available memory capacity of the RAM 13 of this apparatus satisfies the memory capacity required for executing the program (step S603). In other words, the CPU 11 determines whether or not the available memory capacity of the RAM 13 of this apparatus exceeds the memory capacity required for executing the program. When the CPU 11 determines that the available memory capacity is not sufficient (step S603: NO), then the CPU 11 calculates the shortage of memory capacity (step S604), and transmits the memory use request signal to another information processing apparatuses 10, 10, . . . (step S605).

The memory use request signal includes at least information about the memory capacity required for executing the program, and information identifying the information processing apparatus 10 which is the source of the signal. The memory use request signal is transferred successively within the ring network 20, and returned to the source information processing apparatus 10 in a state in which the signal includes information identifying a destination information processing apparatus 10 and information about the available memory capacity in that information processing apparatus 10.

The CPU 11 receives the information about available memory capacity in each of the another information processing apparatuses 10, 10, . . . connected to the ring network 20 (step S606), and extracts information, for example, the IP address identifying the information processing apparatus 10 having the largest available memory capacity among the received information (step S607). The CPU 11 determines whether or not the extracted memory capacity fills the shortage of memory capacity (step S608). When the CPU 11 determines that the extracted memory capacity does not fill the shortage (step S608: NO), then the CPU 11 extracts the information identifying the information processing apparatus 10 having the next largest available memory capacity (step S609). The CPU 11 returns the processing to step S608, and repeats the above-described process.

When the CPU 11 determines that the extracted memory capacity fills the shortage (step S608: YES), then the CPU 11 sets to share the memories with one or a plurality of extracted information processing apparatuses 10, 10, . . . (step S610), and executes the program (step S611). Also, when the CPU 11 determines that the necessary memory capacity is satisfied (step S603: YES), the CPU 11 executes the program (step S611).

According to Embodiment 2 as described above, by sharing the available memories of another information processing apparatuses 10, 10, . . . , it is possible to certainly execute a received program even when the memory capacity to be used by the received program is extremely large.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A network system comprising:
a plurality of information processing apparatuses, each having a memory and a communication section and being connected to a ring network through the communication section, wherein
a program, which is to be executed by sharing a resource of each of the information processing apparatuses, is divided into predetermined units, the divided program being stored redundantly in a plurality of information processing apparatuses for backup, and
a priority level for responding to the transmission request is assigned to each program stored redundantly in the plurality of information processing apparatuses on the basis of whether or not the program is stored for backup, wherein
one information processing apparatus comprises a processor capable of performing operations of:
determining whether or not all pieces of the divided program have been stored in the memory;
transmitting through the communication section to another information processing apparatus a transmission request for the program, according to the priority level, which has not been stored, when a determination is made that there is a program which has not been stored in the memory;
determining whether or not a program received by the communication section is a program transmitted from said another information processing apparatus in response to the transmission request;
storing the program received by the communication section in the memory when a determination is made that the received program is the program transmitted in response to the transmission request; and
executing the program stored in the memory, when a determination is made that all pieces of the divided program have been stored in the memory.

2. The network system according to claim 1, wherein the memory of each information processing apparatus is sharable by a plurality of information processing apparatuses, and information about available memory capacity which is required when executing the program is stored in said plurality of information processing apparatuses, wherein
said processor is further capable of performing operations of:
determining whether or not an available memory capacity of said one information processing apparatus is smaller than the stored available memory capacity;
transmitting a memory use request to other information processing apparatuses through the communication section when a determination is made that the available memory capacity of said one information processing apparatus is smaller than the stored available memory capacity; and
using the memories of other information processing apparatuses in the descending order of the available memory capacity thereof, based on the received information about available memory capacity when information about available memory capacity transmitted from other information processing apparatuses is received.

3. A network system comprising:
a plurality of information processing apparatuses, each having a memory and communication means and being connected to a ring network through the communication means, wherein
a program, which is to be executed by sharing a resource of each of the information processing apparatuses, is divided into predetermined units, the divided program being stored redundantly in a plurality of information processing apparatuses for backup, and a priority level for responding to the transmission request is assigned to each program stored redundantly in a plurality of information processing apparatuses on the basis of whether or not the program is stored for backup, wherein one information processing apparatus comprises:

means for determining whether or not all pieces of the divided program have been stored in the memory;

means for, when a determination is made that there is a program which has not been stored in the memory, transmitting through the communication means to another information processing apparatus a transmission request for the program, according to the priority level, which has not been stored;

means for determining whether or not a program received by the communication means is a program transmitted from said another information processing apparatus in response to the transmission request;

means for, when a determination is made that the received program is the program transmitted in response to the transmission request, storing the program received by said communication means in the memory; and means for, when a determination is made that all pieces of the divided program have been stored in the memory, executing the program stored in the memory.

4. The network system according to claim 3, wherein the memory of each information processing apparatus is sharable by a plurality of information processing apparatuses, and information about available memory capacity which is required when executing the program is stored in said plurality of information processing apparatuses, wherein said one information processing apparatus further comprises:

means for determining whether or not an available memory capacity of the one information processing apparatus is smaller than the stored available memory capacity;

means for, when a determination is made that the available memory capacity of the one information processing apparatus is smaller than the stored available memory capacity, transmitting a memory use request to other information processing apparatuses through the communication means; and means for receiving information about available memory capacity transmitted from other information processing apparatuses, and wherein the memories of other information processing apparatuses are used as a shared memory in the descending order of the available memory capacity thereof, based on the received information about available memory capacity.

5. An information processing method, which uses a network composed of a plurality of information processing apparatuses connected in a ring form and shares a resource of each of the information processing apparatuses, comprising the steps of:

storing an execution program redundantly for backup, which is divided into predetermined units, in a plurality of information processing apparatuses, and assigning a priority level for responding to the transmission request to each program stored on the basis of whether or not the program is stored for backup, causing one information processing apparatus to determine whether or not all pieces of the divided program have been stored;

transmit to another information processing apparatus a transmission request for a program, according to the priority level, which has not been stored when a determination is made that all pieces of the divided program have not been stored;

determine whether or not a program received from another information processing apparatus is a program corresponding to the transmission request;

store the received program when a determination is made that the received program is the program corresponding to the transmission request; and execute the program to be executed when a determination is made that all pieces of the divided program have been stored.

6. An information processing method according to claim 5, wherein a memory of each information processing apparatus is sharable by a plurality of information processing apparatuses, and information about available memory capacity which is required when executing the program is stored in said plurality of information processing apparatuses, wherein said one information processing apparatus determines whether or not an available memory capacity of the one information processing apparatus is smaller than the stored available memory capacity;

transmits a memory use request to another information processing apparatus when a determination is made that the available memory capacity of the one information processing apparatus is smaller than the stored available memory capacity;

receives information about available memory capacity transmitted from other information processing apparatuses; and uses the memories of other information processing apparatuses as a shared memory in the descending order of the available memory capacity thereof, based on the received information about available memory capacity.

* * * * *